United States Patent [19]

Johansen et al.

[11] 4,220,372
[45] Sep. 2, 1980

[54] DUAL WHEEL AND AXLE ASSEMBLY

[75] Inventors: Roy W. Johansen, West Allis; Robert C. Haupt, Wauwatosa, both of Wis.

[73] Assignee: Allis-Chalmers Corporation, Milwaukee, Wis.

[21] Appl. No.: 957,737

[22] Filed: Nov. 6, 1978

[51] Int. Cl.² .................... B60B 11/06; B60B 37/04
[52] U.S. Cl. .................... 301/1; 301/13 SM; 301/36 R; 301/40 S; 403/356; 403/369
[58] Field of Search .............. 301/1, 6 R, 6 D, 36 R, 301/13 R, 13 SM, 111, 112, 114, 122, 38 R, 40 S, 105 R; 403/356, 369-371; 74/230.3

[56] References Cited

U.S. PATENT DOCUMENTS

| | | | |
|---|---|---|---|
| 2,452,458 | 10/1948 | Hahn | 403/356 X |
| 2,637,598 | 5/1953 | Brown et al. | 301/1 |
| 2,726,106 | 12/1955 | Houck | 301/1 X |
| 3,454,305 | 7/1969 | Gilmour, Jr. | 301/1 |
| 3,704,916 | 12/1972 | Dietrich | 301/1 |
| 3,738,691 | 6/1973 | Firth | 403/371 X |
| 3,837,708 | 9/1974 | Donnell | 301/1 |
| 4,005,907 | 2/1977 | Bonomo | 301/36 R |

FOREIGN PATENT DOCUMENTS 216544  4/1958  Australia ................... 403/370

Primary Examiner—Charles M. Marmor
Attorney, Agent, or Firm—Arthur L. Nelson

[57] ABSTRACT

A dual wheel and axle assembly having a wedge lock hub and axle assembly with an auxiliary clamp to augment the grip of the hub on the drive axle. A drive is provided to force bushing segments between the wheel hub and the drive axle to firmly lock the wheel hub and axle together. One of the bushing segments has an extension which extends axially along the drive shaft and carries a clamp in the form of at least one U-bolt having curvature mating that of the peripheral surface of the drive axle. The U-bolt is firmly clamped against a portion of the drive axle while the extension of the bushing segment which has an integral key firmly seats in a key slot of the drive axle to augment the grip of the wheel hub on the drive axle to accommodate additional torque produced by adding dual wheels to a conventional single wheel drive on the tractor.

10 Claims, 4 Drawing Figures

DUAL WHEEL AND AXLE ASSEMBLY

This invention relates to a wheel and axle assembly and more particularly to bushing segments having tapered surfaces to lock the axle to the hub with an extension extending axially over the axle with a clamp to further strengthen the grip of the wheel hub on the axle to accommodate the addition of dual drive wheels on a tractor.

Under most conditions, a single drive wheel on each side of the tractor is adequate to provide the traction necessary for driving the tractor and pulling the implement. Where increased traction and floatation of the tractor is necessary, particularly where the terrain is soft or loose, the addition of an extension wheel on each side to provide dual wheels may be necessary. While the second of the dual wheels may be mounted directly to the drive shaft, the mounting of the second wheel can be accomplished by mounting a sleeve axially with the first rim and extending to the rim of the second wheel with a clamping means to clamp the two wheels snugly together. This type of a dual wheel arrangement is easily assembled and disassembled and usually provides adequate traction and floatation. It also provides a means for mounting dual wheels without having the extra length of shaft extending from the tractor which normally is not used and can be an inconvenience if it extends too far beyond the single wheels under normal operating conditions. Such an installation, however, does produce additional stress due to the cantilever effect of the dual wheels which tend to loosen the hub from the drive axle and cause the wheel to creep axially. The addition of the dual wheels also creates an additional torque which must be transmitted through the hub of the wheels from the drive axle. With the additional strain on the hub, it is inherent that the grip on the drive axle must be augmented to avoid loosening or creeping on the drive shaft which produces a change in the tread width of the wheels.

Accordingly, this invention provides a means where the grip of the single drive wheels can be augmented when a dual wheel is attached to the rim through a suitable clamping means.

It is an object of this invention to provide a wheel and axle assembly with an extension from the hub having a clamp to grip the drive axle axially from the original wedge lock assembly of the drive wheel.

It is another object of this invention to provide dual wheels with a rim extension for a tractor having a wedge locked hub and an auxiliary clamp extending axially from the hub of the wheel to increase the grip on the drive shaft.

It is a further object of this invention to provide a dual wheel assembly with a wedge lock on the axle which axially wedges bushings between the wheel and axle with an extension from the wheel hub providing a clamp axially spaced from the hub to further augment the grip of the wheel and axial assembly on the drive shaft.

The objects of this invention are accomplished by a wheel axle assembly having locking bushings which wedge axially between the hub and the drive axle to lock the hub and axle together. The bushing segments have a cylindrical inner peripheral surface mating the surface of the drive axle while the external surface of the bushing segments have the same degree of taper as the inner periphery of the wheel hub. A drive means is provided to force the bushing segments between the wheel hub and the drive axle to firmly lock the wheel hub and axle together. One of the bushing segments has an extension which extends axially along the drive shaft and carries a clamp in the form of at least one U-bolt having a curvature mating that of the peripheral surface of the drive axle. Increasing the number of U-bolts will increase the clamping pressure of the device. The U-bolt is firmly clamped against a portion of the drive shaft while the extension of the bushing segment which has an integral key firmly seats on the drive axle to form additional clamping means to augment the grip of the wheel hub on the drive axle to accommodate additional torque produced by adding dual wheels to a conventional single wheel drive on the tractor. The addition of the extension on wheel hub may be accomplished through adding the extension as a field installation or as a factory installation.

Referring to the drawings, the preferred embodiment of this invention is shown.

Figure 1:
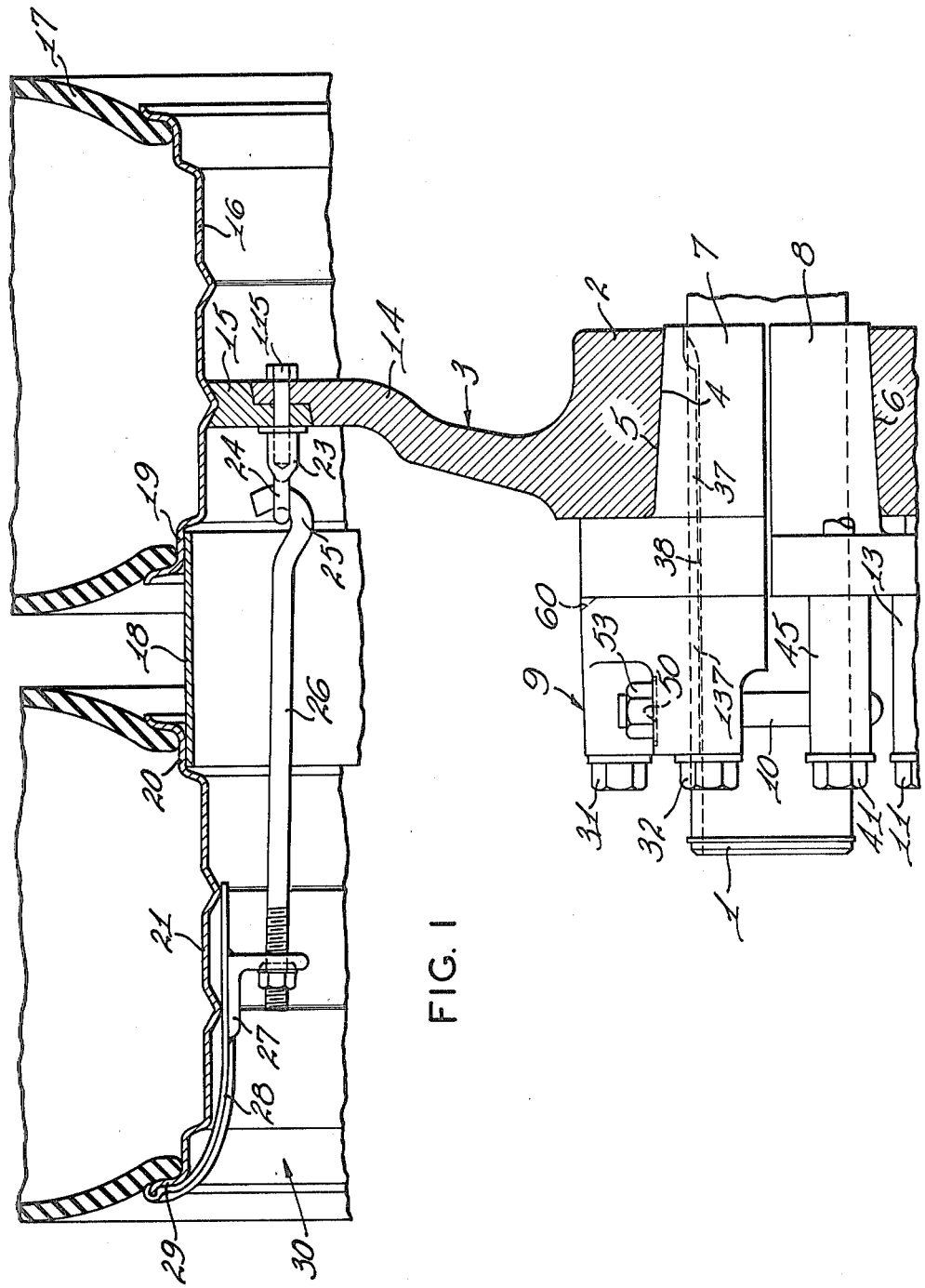
FIG. 1 is a partial cross section view of dual wheels mounted on a wheel and axle assembly.

FIG. 1 illustrates a dual wheel assembly mounted on a drive axle 1. The hub 2 of the wheel 3 is formed with a tapered inner surface 4. Mating tapered surfaces 5 and 6 are formed on the inner periphery of the bushing segments 7 and 8. The bushing segment 7 carries the extension clamp 9 which in turn carries the U-bolt 10 which is firmly clamped around the drive axle 1. The bushing segment 8 is firmly clamped in the wheel hub 2 by the bolts 11, 40 and 41. The bolt 11 carries the washer 12 and option spacers 13 which is shown in the clamped position. The spacers permit use of longer bolts which have greater resilience to maintain tension on the bushing segment.

The wheel 3 includes the disk 14 extending radially to a plurality of lugs 15 of which one is shown. The lugs carry the rim 16 supporting the tire 17. The lugs are firmly clamped in position to carry the wheel by means of a plurality of bolts 115. The sleeve 18 is seated on a cylindrical flange 19 and extends to a similar flange 20 on the rim 21. The nut 23 is fastened on the wheel disk 14 and lug 15 forms an eyelet 24 for receiving the hook 25 of bolt 26. Bolt 26 is fastened to the angle 27 of clamp 28. Clamp 28 engages the outer flange 29 of the rim 21 for pressing the wheels 30 and 3 firmly together.

The dual wheels produce a cantilever mounting of the wheel 30 on the wheel 3 and can be readily assembled and disassembled when needed.

Figure 2:
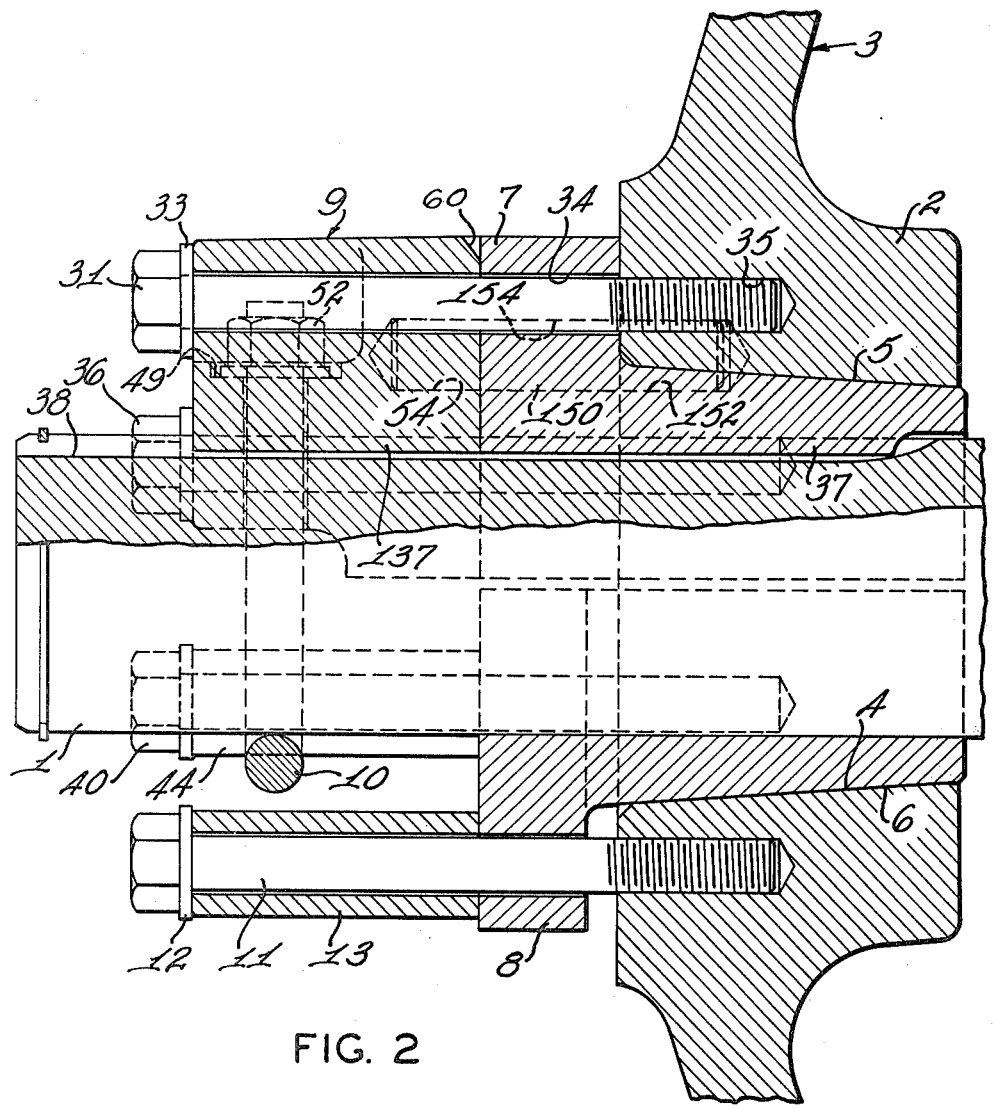
FIG. 2 is a cross section view taken on line II—II of FIG. 4.
Figure 3:
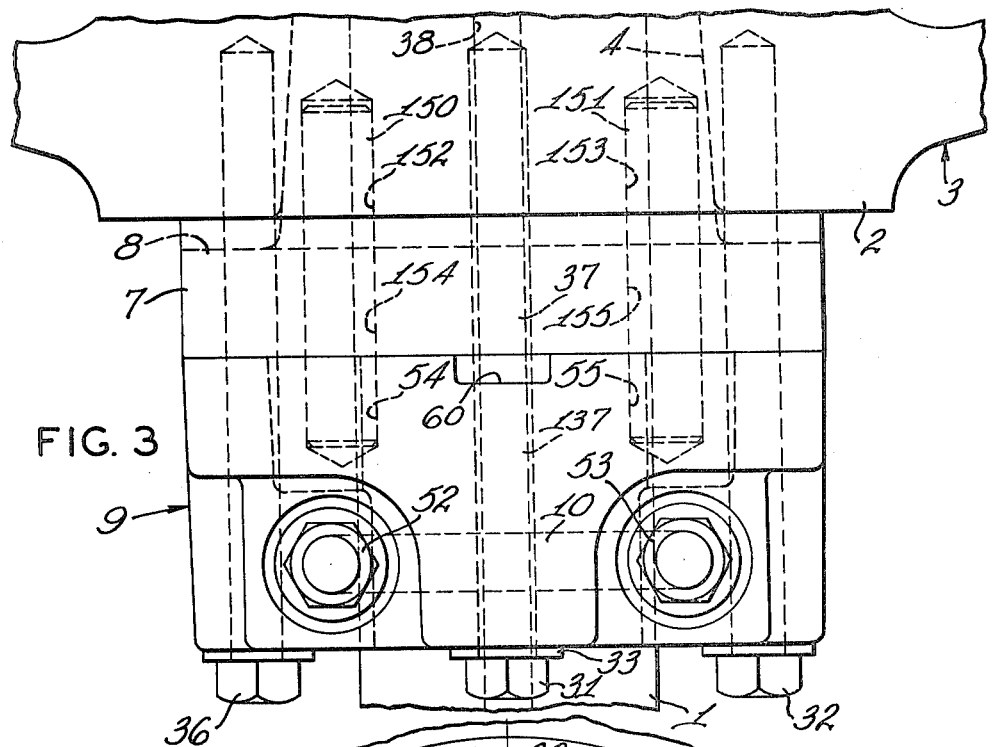
FIG. 3 is a plan view of the wheel hub and axle assembly.
Figure 4:
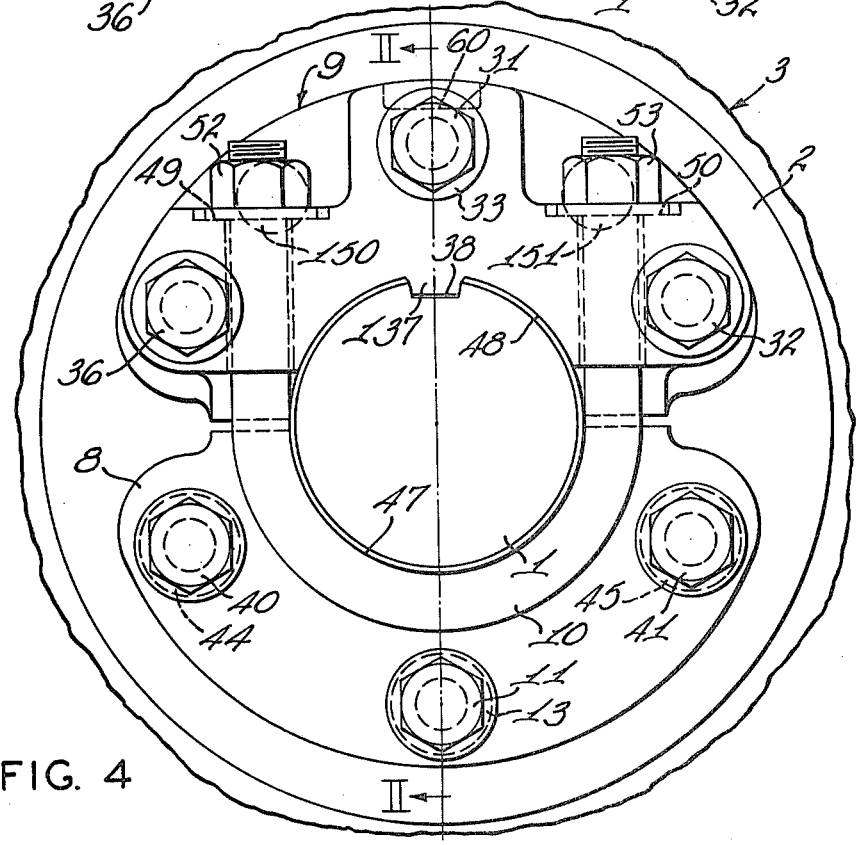
FIG. 4 is an end view taken from the end of the rear axle showing the wheel hub clamped on the drive axle.

FIGS. 2, 3 and 4 show the extension in position. The bushing segment 7 is forced between the wheel hub 2 and the rear axle 1 by means of the bolts 31, 32 and 36. The bolt 31 seats on the washer 33 and extends through an opening 34 in the bushing segment 7 and threadedly engages the hub 2 in a threaded opening 35. The bolts 32 and 36 are similarly fastened. Under less severe operation such as when a single drive wheel is used on each side of the tractor, the extension 9 is not needed and the bolts would be shorter. There is adequate locking friction between the hub 2, bushing segments 7 and 8 and the drive axle 1. The bushing segment 7 is formed integral with a key 37 which is received in the key slot 38 of the axle 1.

The bushing segment 8 is also forced into locking engagement by the bolts 11, 40 and 41. Shorter bolts are normally used when the extension 9 and spacers 13 are not used. When the extension is used, spacers 13, 44 and 45 can be provided to seat the bushing segment 8 in the locking position as shown.

The mounting of the extension 9, however, provides a means for clamping of the axle 1 to the extension 9 by the U-bolt 10. The U-bolt 10 extends around the periphery of the axle 1 and forms an arcuate curvature 47 mating the periphery of the axle 1. Similarly, the curvature 48 of the extension 9 is a mating surface engaging the periphery of the axle 1 on its upper surface.

The extension 9 is formed with surfaces 49 and 50 normal to the vertical axial centers of the U-bolt 10 where it extends through the extension 9 and fastens to the nuts 52 and 53. The nuts 52 and 53 are firmly tightened. The arcuate surface 48 firmly seats on the drive shaft as well as the arcuate surface 47 of the U-bolt 10. The key portion 37 of bushing segment 7 and key portion 137 of the extension 9 is also forced into the keyway 38 of axle 1. This provides an additional locking structure for the wheel and axial assembly.

Alignment and locking of the extension 9 on the bushing segment 7 is assured because of the dowels 150 and 151 which extend through openings 152 and 153 in the hub and holes 154 and 155 in the bushing segment 7. Similarly, openings 54 and 55 are provided in the extension 9 to receive the dowels 150 and 151. Longer dowels are used to accommodate the use of the extension 9, segmented bushing 7, and hub 2 when the extension is used for the additional clamping required when using the dual wheel assembly.

The device operates in the following manner:

The drive axle 1 is received within the opening 4 in the wheel hub 2. The bushing segments 7 and 8 are pressed between the wheel hub 2 and the axle 1 as the bolts 31, 32 and 36 are tightened in the hub 2. The bolts 11, 40 and 41 are similarly tightened in the wheel hub to force the bushing segment 8 axially within the opening 4. Since the taper of the bushing segments 7 and 8 is the same as the inner periphery of the wheel hub 2 and the inner periphery of the bushing segments 7 and 8 are cylindrical, frictional engagement of the bushing segments 7 and 8 is formed on the surfaces engaging the mating assembled components. Normally, the bolts are tightened to firmly lock the wheel 3 to the axle 1. However, when the extension 9 is assembled on the bushing segment 7, longer dowel pins 150 and 151 are inserted in the openings of the hub, the bushing segment 7 and the extension 9. Then the longer bolts 31, 32 and 36 are inserted in the assembly to firmly lock the assembly together. Similarly, the bolts 11, 40 and 41 are positioned in the spacers 13, 44 and 45 to lock the bushing segment 8 with the wheel hub 2 on axle 1. Key 37 of bushing segment 7 and key 137 of extension 9 are aligned in keyway 38. With this assembly, the U-bolt 10 is then tightened around the axle 1 by means of the nuts 52 and 53 to firmly lock the U-bolt 10 around the axle and firmly seat the extension 9 on the axle to provide an additional gripping of the axle by the hub assembly. The opening 60 in the extension 9 provides means of permitting the driving of a wedge for removal of the extension 9 from the bushing segment 7.

The locking assembly provides a means whereby the bushing segments 7 and 8 can be used to lock the wheels 3 to the axle 1 without the extension 9 for single rear drive wheels on the tractor. With the use of dual wheels, as shown in FIG. 1, additional torque is transmitted from the axle to the wheels and accordingly an additional gripping of the rear axle 1 can be achieved through the extension 9 and the related components as previously described. This assembly can be assembled in the field or it can be installed as original equipment in the factory.

The embodiments of the invention in which an exclusive property or privilege is claimed are described as follows:

1. An adjustable wheel and axle assembly comprising, a wheel including a hub defining a tapered central opening, a drive axle received in said opening, at least two wedged bushing segments disposed within the central opening and mounted on said drive axle, axial drive means forcing said bushing segments to lock said axle in said hub, an extension fastened on one of said wedged bushing segments and extending axially from said wheel hub, means aligning said extension with said bushing, clamping means on said extension for clamping said drive axle to said extension on said bushing segment to thereby increase the bearing surface on said shaft and lock said axle to said hub.

2. An adjustable wheel and axle assembly as set forth in claim 1 wherein said hub and said wheel define an integral structure.

3. An adjustable wheel and axle assembly as set forth in claim 1 wherein said drive means includes bolts connecting said extension to one of said bushing segments and said hub for locking said assembly together, said aligning means including dowel pins aligning and locking said bushing segment with said extension.

4. An adjustable wheel and axle assembly as set forth in claim 1 wherein said clamping means includes at least one U-bolt connecting said axle with said extension for augmenting the clamping of said wheel with said axle.

5. An adjustable wheel and axle assembly as set forth in claim 1 including dual wheels mounted on said wheel hub for transmitting driving torque from said drive axle.

6. An adjustable wheel and axle assembly as set forth in claim 1 wherein said wheel includes dual wheels where the second of said dual wheels extends over the extension on said bushing segment, said wheel hub and extension thereby provide the locking means for locking said hub with said drive axle.

7. An adjustable wheel and axle assembly as set forth in claim 1 wherein one of said bushing segments defines a key, said extension defines a second key, said drive axle defines a key slot for receiving said keys on said bushing segment and said extension for locking said bushing segment and extension with said drive axle.

8. An adjustable wheel and axle assembly as set forth in claim 1 wherein said bushing segments each define a semi-cylindrical configuration and a semi-cylindrical inner periphery for engaging said drive axle and a tapered outer peripheral surface engaging a mating tapered surface on said hub for locking said wheel and axle assembly together.

9. An adjustable wheel and axle assembly as set forth in claim 1 wherein said drive means defines bolts extending axially parallel with said drive axle, said clamping means defines at least one U-bolt connecting said extension with said drive axle.

10. An adjustable wheel and axle assembly as set forth in claim 1 wherein said drive means includes bolts axially locking said bushing segments, said drive axle and said wheel hub together, a second wheel mounted on the rim of said first wheel to provide dual wheels driving from said hub, said clamping means defines a U-bolt connecting said extension with said drive axle to thereby augment the clamping force of said wheel and axle assembly.

* * * * *